US 11,733,350 B2

(12) United States Patent
Matsuo et al.

(10) Patent No.: US 11,733,350 B2
(45) Date of Patent: Aug. 22, 2023

(54) OBJECT IDENTIFICATION APPARATUS, OBJECT IDENTIFICATION METHOD, AND OBJECT IDENTIFICATION PROGRAM

(71) Applicant: NEC Corporation, Tokyo (JP)

(72) Inventors: Daisuke Matsuo, Tokyo (JP); Akihiko Sugiyama, Tokyo (JP); Kazumine Ogura, Tokyo (JP); Shingo Yamanouchi, Tokyo (JP); Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 480 days.

(21) Appl. No.: 16/963,971

(22) PCT Filed: Jan. 25, 2018

(86) PCT No.: PCT/JP2018/002360
§ 371 (c)(1),
(2) Date: Jul. 22, 2020

(87) PCT Pub. No.: WO2019/146055
PCT Pub. Date: Aug. 1, 2019

(65) Prior Publication Data
US 2021/0041532 A1  Feb. 11, 2021

(51) Int. Cl.
*G01S 7/41* (2006.01)
*G01S 13/524* (2006.01)
(Continued)

(52) U.S. Cl.
CPC ............ *G01S 7/412* (2013.01); *G01S 13/524* (2013.01); *G01S 13/36* (2013.01)

(58) Field of Classification Search
CPC ........ G01S 7/412; G01S 13/524; G01S 13/36; G01S 7/414; G01S 7/415; G01S 13/32;
(Continued)

(56) References Cited

U.S. PATENT DOCUMENTS 9,229,102 B1 * 1/2016 Wright .................. G01S 13/885
2008/0042894 A1   2/2008 Kikuchi
(Continued)

FOREIGN PATENT DOCUMENTS

JP   S63-196881 A   8/1988
JP   H01-31079 A    2/1989
(Continued)

OTHER PUBLICATIONS

Japanese Office Action for JP Application No. 2019-567479 dated Mar. 22, 2022 with English Translation.
(Continued)

*Primary Examiner* — Donald H B Braswell
(74) *Attorney, Agent, or Firm* — Sughrue Mion, PLLC

(57) ABSTRACT

There is provided an object identification apparatus for identifying a stationary object and a moving object. The object identification apparatus includes a phase difference calculator that calculates phase difference information between a transmission signal and a reception signal obtained by reflecting, by surfaces of the moving object and the stationary object in a space, the transmission signal emitted to the space and receiving the reflected transmission signal, a distance calculator that calculates distance information using the phase difference information, a distance information separator that separates the distance information into moving object distance information as distance information about the moving object and stationary object distance information as distance information about the stationary object, and an identifier that identifies the stationary object and the moving object based on the stationary object distance information and the moving object distance information.

9 Claims, 12 Drawing Sheets

(51) Int. Cl.
*G01S 13/52* (2006.01)
*G01S 13/36* (2006.01)

(58) Field of Classification Search
CPC ...... G01S 13/341; G01S 13/38; G01S 13/536; G01S 13/888
See application file for complete search history.

(56) References Cited

U.S. PATENT DOCUMENTS

| | | | | |
|---|---|---|---|---|
| 2015/0301167 | A1* | 10/2015 | Sentelle | H01Q 9/27 342/22 |
| 2017/0269201 | A1* | 9/2017 | Adachi | G01S 13/931 |
| 2018/0164406 | A1* | 6/2018 | Culkin | G01S 7/2923 |
| 2019/0146081 | A1* | 5/2019 | Bilik | G01S 13/584 701/301 |

FOREIGN PATENT DOCUMENTS

| | | |
|---|---|---|
| JP | H02-287177 A | 11/1990 |
| JP | H05-23170 U | 3/1993 |
| JP | H05-203732 A | 8/1993 |
| JP | 2001-318143 A | 11/2001 |
| JP | 2004-361154 A | 12/2004 |
| JP | 2007-155396 A | 6/2007 |
| JP | 2010-175383 A | 8/2010 |
| JP | 2012-137432 A | 7/2012 |
| JP | 2016-045045 A | 4/2016 |
| JP | 2016-065721 A | 4/2016 |
| JP | 2017-173948 A | 9/2017 |
| JP | 2017-203751 A | 11/2017 |
| WO | 2011/158292 A1 | 12/2011 |
| WO | 2015/102713 A1 | 7/2015 |

OTHER PUBLICATIONS

JP Office Action for JP Application No. 2019-567479, dated Sep. 6, 2022 with English Translation.
International Search Report for PCT Application No. PCT/JP2018/002360, dated Apr. 3, 2018.
H. Krim and M. Viberg, "Two decades of array signal processing research: the parametric approach," in IEEE Signal Processing Magazine, vol. 13, No. 4, pp. 67-94, Jul. 1996, USA.

* cited by examiner

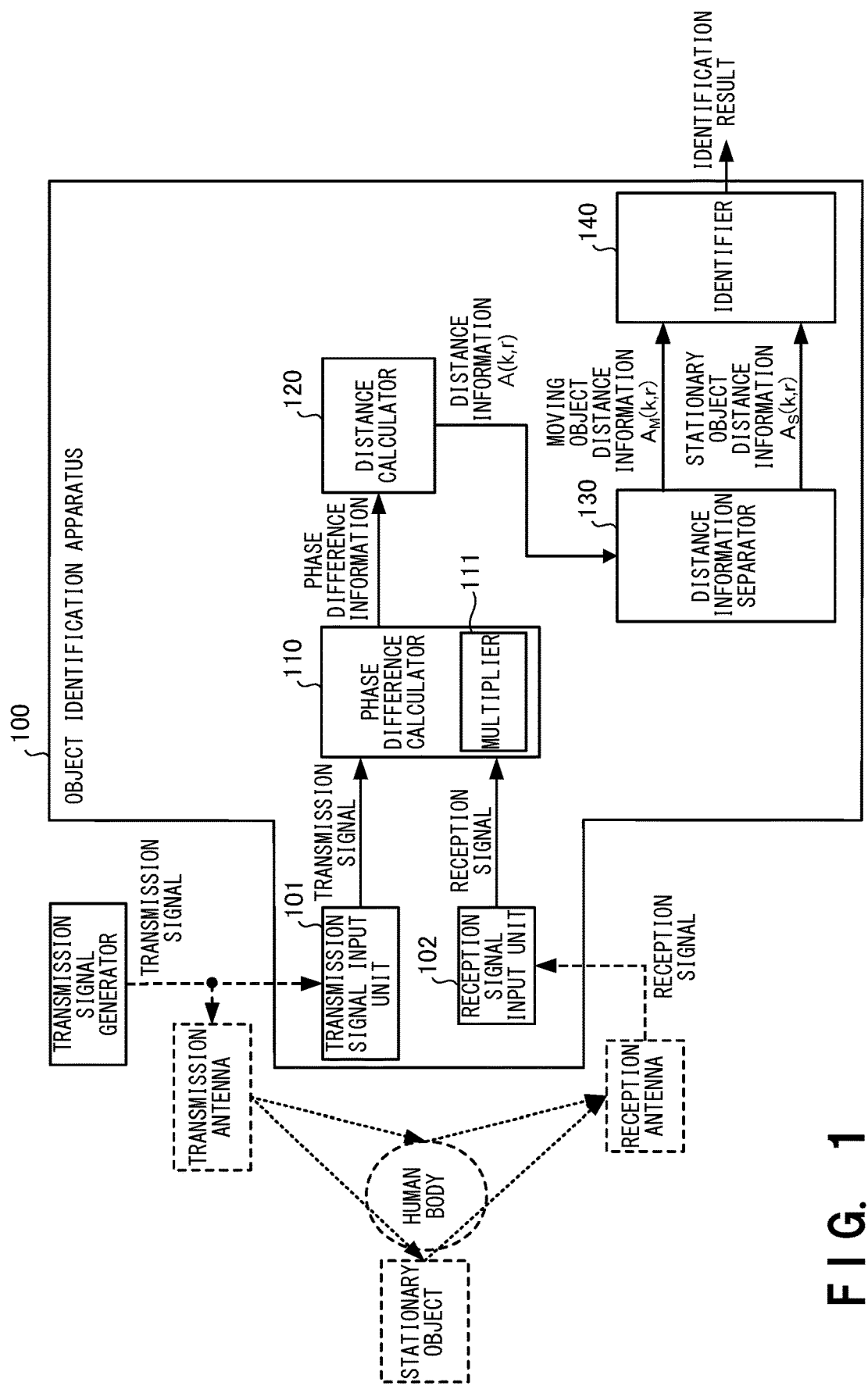
F I G. 1

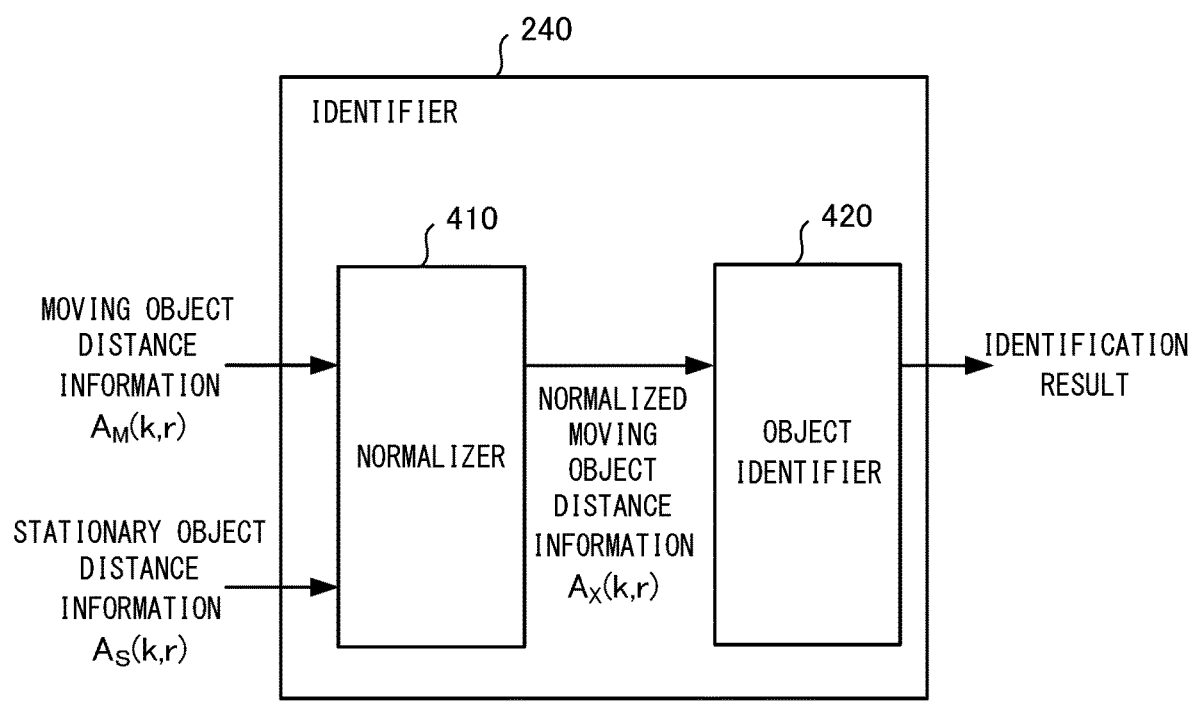
F I G. 4

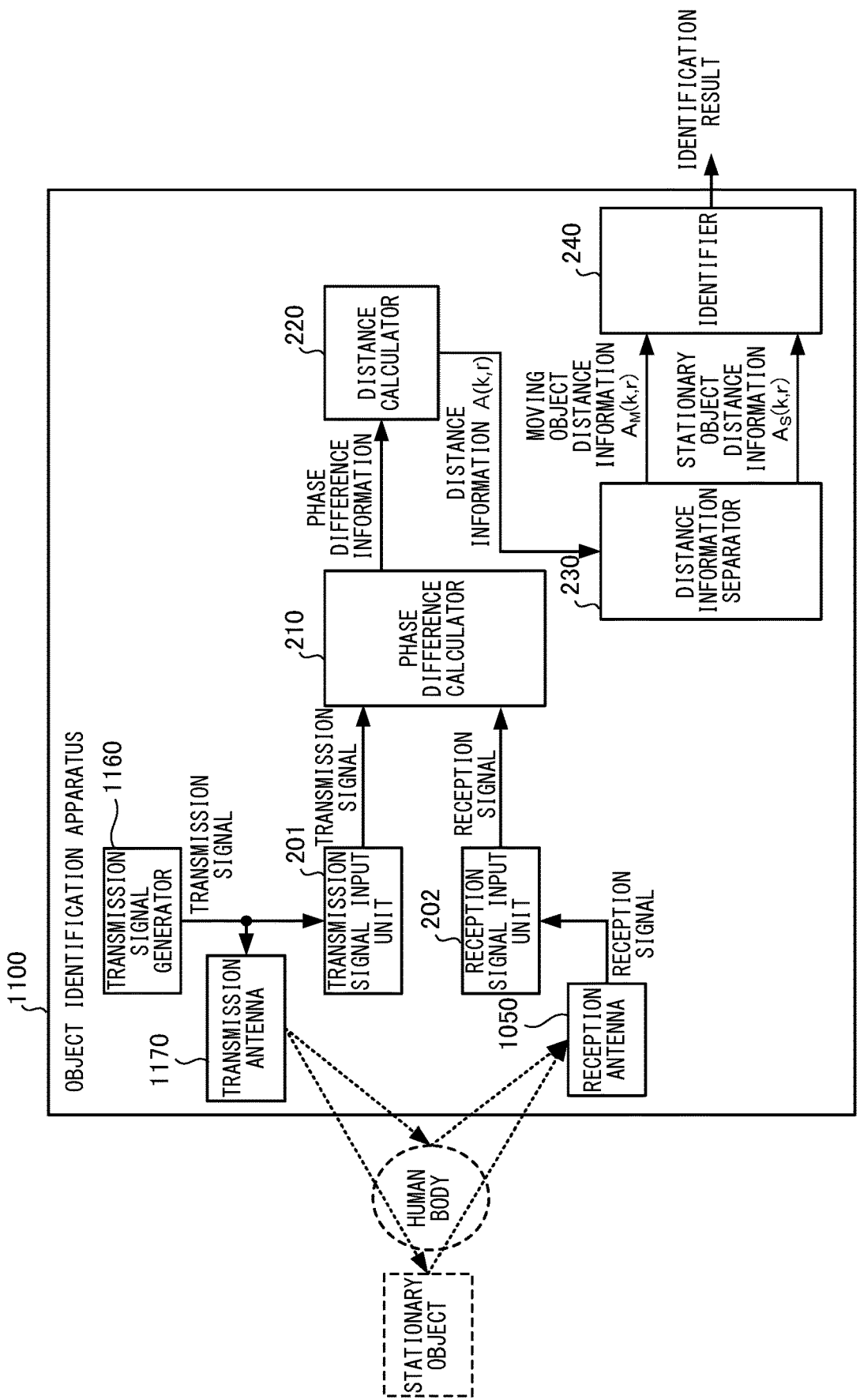
F I G. 11

OBJECT IDENTIFICATION APPARATUS, OBJECT IDENTIFICATION METHOD, AND OBJECT IDENTIFICATION PROGRAM

TECHNICAL FIELD

This application is a National Stage Entry of PCT/JP2018/002360 filed on Jan. 25, 2018, the contents of all of which are incorporated herein by reference, in their entirety.

The present invention relates to an object identification apparatus, an object identification method, and an object identification program.

BACKGROUND ART

Patent literature 1 describes a technique of detecting a human body existing in an indoor environment or behind a wall by calculating the difference between current and past radar reception signals to remove a reflection component, from a background stationary object (a wall, furniture, or the like), which is kept constant with time.

CITATION LIST

Patent Literature

Patent literature 1: WO 2015/102713

Non-Patent Literature

Non-patent literature 1: H. Krim and M. Viberg, "Two decades of array signal processing research: the parametric approach," in IEEE Signal Processing Magazine, vol. 13, no. 4, pp. 67-94, July 1996.

SUMMARY OF THE INVENTION

Technical Problem

In the techniques described in the above literatures, however, if a background stationary object such as a wall or furniture exists behind a human body when viewed from a radar apparatus in an environment such as an indoor environment, an irradiation wave from the radar apparatus to the background stationary object or a reflected wave from the background stationary object to the radar apparatus may be blocked by the human body. This phenomenon is generally called a shadowing effect.

In this case, the reflection component from the background stationary object may vary in accordance with the movement of the human body. At this time, as described in patent literature 1, even if the reflection component that is kept constant with time is removed, the reflection component from the background stationary object may remain as a varying reflection component and a virtual image may be formed at the position of the background stationary object.

Therefore, in the technique described in patent literature 1, it is impossible to detect only the human body in the environment in which the background stationary object exists behind the moving human body.

The present invention provides a technique of solving the above-described problem.

Solution to Problem

One example aspect of the present invention provides an object identification apparatus comprising a phase difference calculator that calculates phase difference information between a transmission signal and a reception signal by receiving the transmission signal and the reception signal received by reflecting, by a moving object and a stationary object located in a space, the transmission signal emitted to the space, a distance calculator that calculates distance information using the phase difference information, a distance information separator that separates the distance information into moving object distance information as distance information about the moving object and stationary object distance information as distance information about the stationary object, and an identifier that identifies the stationary object and the moving object based on the stationary object distance information and the moving object distance information.

Another example aspect of the present invention provides an object identification method comprising calculating phase difference information between a transmission signal and a reception signal, calculating distance information using the phase difference information, separating the distance information into moving object distance information as distance information about a moving object and stationary object distance information as distance information about a stationary object, and identifying the stationary object and the moving object based on the stationary object distance information and the moving object distance information.

Still other example aspect of the present invention provides an object identification program for causing a computer to execute a method, comprising calculating phase difference information between a transmission signal and a reception signal, calculating distance information using the phase difference information, separating the distance information into moving object distance information as distance information about a moving object and stationary object distance information as distance information about a stationary object, and identifying the stationary object and the moving object based on the stationary object distance information and the moving object distance information.

Advantageous Effects of Invention

According to the present invention, it is possible to detect only a human body in an environment in which a background stationary object exists behind the moving human body.

BRIEF DESCRIPTION OF DRAWINGS

FIG. 1 is a block diagram showing the arrangement of an object identification apparatus according to the first example embodiment of the present invention;

FIG. 4 is a block diagram showing the arrangement of an identifier according to the second example embodiment of the present invention;

FIG. 11 is a block diagram showing the arrangement of an object identification apparatus according to the seventh example embodiment of the present invention.

DESCRIPTION OF EXAMPLE EMBODIMENTS

Figure 2:
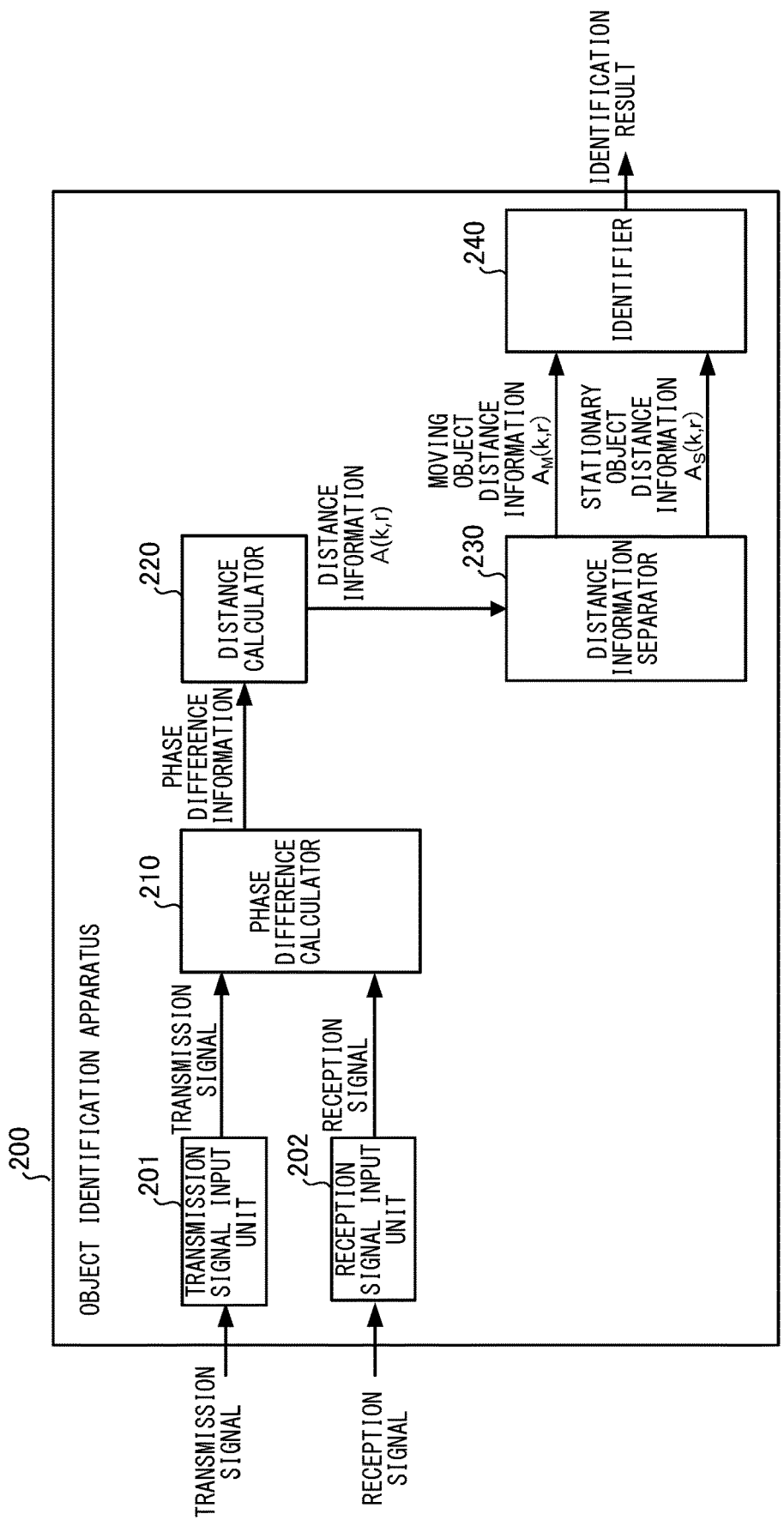
FIG. 2 is a block diagram showing the arrangement of an object identification apparatus according to the second example embodiment of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise. Throughout the accompanying drawings, each one-way arrow simply represents the flow direction of a given signal, and does not exclude bidirectionality.

First Example Embodiment

An object identification apparatus 100 according to the first example embodiment of the present invention will be described with reference to FIG. 1. The object identification apparatus 100 includes a transmission signal input unit 101, a reception signal input unit 102, a phase difference calculator 110, a distance calculator 120, a distance information separator 130, and an identifier 140.

A transmission signal generator generates a transmission signal, and supplies it to the transmission signal input unit 101 and a transmission antenna. The transmission signal input unit 101 receives the transmission signal from the transmission signal generator, and supplies it to the phase difference calculator 110. The transmission antenna irradiates a space with the transmission signal supplied from the transmission signal generator.

A human body and a stationary object existing in the space each reflect, by its surface, the transmission signal emitted from the transmission antenna. Part of the reflected transmission signal reaches a reception antenna. The reception antenna receives, as a reception signal, the transmission signal reflected by the human body and the stationary object, and supplies it to the reception signal input unit 102. The reception signal input unit 102 receives the reception signal from the reception antenna, and supplies it to the phase difference calculator 110.

The phase difference calculator 110 is supplied with the transmission signal from the transmission signal input unit 101 while being supplied with the reception signal from the reception signal input unit 102. The phase difference calculator 110 calculates phase difference information between the transmission signal and the reception signal, and supplies it to the distance calculator 120.

The phase difference calculator 110 includes a multiplier 111. For a pulse system radar, the multiplier 111 calculates the cross-correlation between the transmission signal and the reception signal, and supplies it as phase difference information to the distance calculator 120. For an FMCW radar, the multiplier 111 generates phase difference information by applying a low-pass filter to the product of the transmission signal and the reception signal, and supplies the generated phase difference information to the distance calculator 120.

The distance calculator 120 calculates distance information $A(k, r)$ using the phase difference information received from the phase difference calculator 110. Note that k represents a measurement frame number and r represents a distance from the object identification apparatus 100. The distance calculator 120 supplies the distance information $A(k, r)$ to the distance information separator 130. For the pulse system radar, the distance calculator 120 calculates the distance information $A(k, r)$ by converting a phase difference included in the phase difference information into a distance, and supplies the distance information $A(k, r)$ to the distance information separator 130. For the FMCW radar, the distance calculator 120 calculates the frequency spectrum of the phase difference information by performing Fourier transformation for the phase difference information, and supplies, to the distance information separator 130, the distance information $A(k, r)$ obtained by converting the frequency into a distance.

The distance information $A(k, r)$ includes a reflection component from the human body and that from the stationary object. Since the human body moves and the stationary object is in a still state, a component with a large change of the distance information $A(k, r)$ is caused by reflection from the human body and a component with a small change of the distance information $A(k, r)$ is caused by reflection from the stationary object. Therefore, by separating the distance information $A(k, r)$ based on the change amounts, pieces of distance information about the human body and the stationary object can be obtained separately. The distance information separator 130 separates the distance information $A(k, r)$ received from the distance calculator 120 into moving object distance information $A_M(k, r)$ and stationary object distance information $A_S(k, r)$, and supplies them to the identifier 140.

If, as shown in FIG. 1, there exists the human body between the stationary object and the transmission antenna or the reception antenna, part or all of the transmission signal from the transmission antenna to the stationary object or the transmission signal from the stationary object to the reception antenna is blocked by the human body. Thus, the strength of the reception signal from the stationary object changes along with the movement of the human body. This phenomenon is called shadowing. Due to this change of the strength, the moving object distance information $A_M(k, r)$ may include a virtual image at the distance of the stationary object in addition to the reflection component from the human body. Since this virtual image causes erroneous detection of the human body, it is necessary to identify reflection from the human body and the virtual image formed at the distance of the stationary object, both of which are included in the moving object distance information $A_M(k, r)$.

The identifier 140 identifies the human body and the stationary object by removing the virtual image formed at the distance of the stationary object using the moving object distance information $A_M(k, r)$ and the stationary object distance information $A_S(k, r)$ received from the distance information separator 130. The identifier 140 outputs an identification result.

With the above arrangement, it is possible to remove a virtual image formed at the distance of a stationary object in an environment in which the stationary object exists behind a moving human body, thereby making it possible to detect only the human body.

Second Example Embodiment

<<Overall Arrangement>>

An object identification apparatus 200 according to the second example embodiment of the present invention will be described next with reference to FIGS. 2 to 4. FIG. 2 is a block diagram for explaining the arrangement of the object identification apparatus 200 according to the second example embodiment.

The object identification apparatus 200 includes a transmission signal input unit 201, a reception signal input unit 202, a phase difference calculator 210, a distance calculator 220, a distance information separator 230, and an identifier 240.

The transmission signal input unit 201 receives a transmission signal, and supplies it to the phase difference calculator 210. The reception signal input unit 202 receives, as a reception signal, the transmission signal reflected by a human body and a stationary object, and supplies it to the phase difference calculator 210.

The phase difference calculator 210 is supplied with the transmission signal from the transmission signal input unit 201 while being supplied with the reception signal from the reception signal input unit 202. The phase difference calculator 210 calculates phase difference information between the transmission signal and the reception signal, and supplies it to the distance calculator 220.

The distance calculator 220 calculates distance information A(k, r) using the phase difference information received from the phase difference calculator 210, and supplies the calculated distance information to the distance information separator 230.

The distance information separator 230 separates the distance information A(k, r) received from the distance calculator 220 into moving object distance information $A_M(k, r)$ and stationary object distance information $A_S(k, r)$, and supplies them to the identifier 240.

The identifier 240 identifies the human body and the stationary object by removing a virtual image formed at the distance of the stationary object using the moving object distance information $A_M(k, r)$ and the stationary object distance information $A_S(k, r)$ received from the distance information separator 230. The identifier 240 outputs an identification result.

<<Arrangement of Distance Information Separator>>

Figure 3:
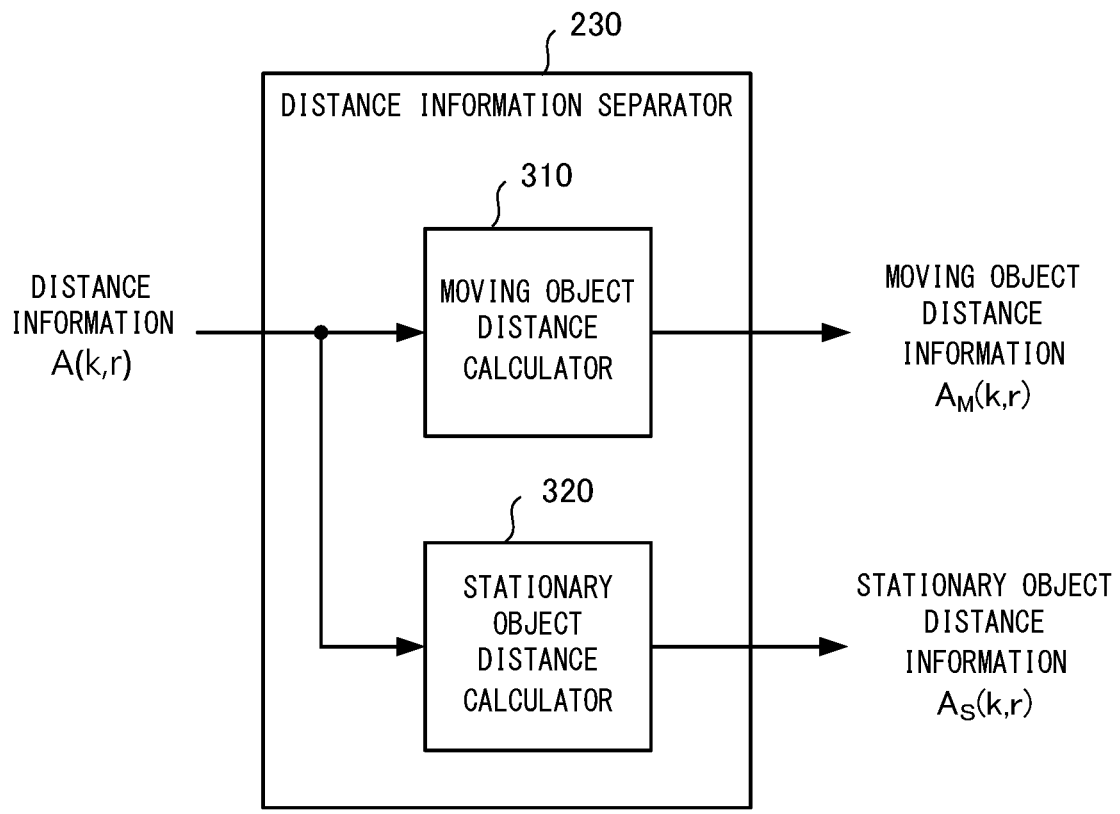
FIG. 3 is a block diagram showing the arrangement of a distance information separator according to the second example embodiment of the present invention.

FIG. 3 is a block diagram for explaining the arrangement of the distance information separator 230 included in the object identification apparatus 200 according to this example embodiment. As shown in FIG. 3, the distance information separator 230 includes a moving object distance calculator 310 and a stationary object distance calculator 320.

The stationary object distance information 320 receives the distance information A(k, r), and calculates, as the stationary object distance information $A_S(k, r)$, a component with a small variation of the distance information A(k, r). For example, the component with a small variation can be extracted by calculating the average of pieces of distance information A(l, r) over latest M measurement frames, given by:

$$A_S(k, r) = \frac{1}{M} \sum_{l=k-M+1}^{k} A(l, r) \quad (1)$$

Alternatively, the component with a small variation may be extracted using equation (2) below that indicates an index moving average that gives a large weight to the latest data.

$$A_S(k,r) = \alpha A_S(k-1,r) + (1-\alpha)A(k,r) \quad (2)$$

where $\alpha$ represents a constant that decides a weight in the index moving average, and falls within the range from 0 (exclusive) to 1 (exclusive). The above-described methods of extracting a component with a small variation remove a component with a large variation by applying a low-pass filter, and may apply other various kinds of low-pass filters. The stationary object distance calculator 320 outputs the stationary object distance information $A_S(k, r)$.

The moving object distance calculator 310 receives the distance information A(k, r), and calculates, as the moving object distance information $A_M(k, r)$, a component with a large variation of the distance information. For example, the moving object distance calculator 310 extracts only a component that varies between frames by calculating the difference in distance information A(k, r) between successive measurement frames, given by:

$$A_M(k,r) = A(k,r) - A(k-1,r) \quad (3)$$

The distance information A(k, r) is calculated by performing linear transformation for the reception signal as the sum of a reflected wave from the human body and a reflected wave from the stationary object. Thus, the distance information A(k, r) is the sum of the stationary object distance information $A_S(k, r)$ and the moving object distance information $A_M(k, r)$. Therefore, only the component with a large variation may be extracted by calculating the stationary object distance information $A_S(k, r)$, similar to the stationary object distance calculator 320, and subtracting the stationary object distance information $A_S(k, r)$ as the component with a small variation from the distance information A(k, r), given by:

$$A_M(k,r) = A(k,r) - A_S(k,r) \quad (4)$$

Components with small variations may be removed by applying other various high-pass filters. The moving object distance calculator 310 outputs the moving object distance information $A_M(k, r)$.

<<Arrangement of Identifier>>

FIG. 4 is a block diagram for explaining the arrangement of the identifier 240 included in the object identification apparatus 200 according to this example embodiment. As shown in FIG. 4, the identifier 240 includes a normalizer 410 and an object identifier 420.

The normalizer 410 receives the moving object distance information $A_M(k, r)$ and the stationary object distance information $A_S(k, r)$, and normalizes the moving object distance information $A_M(k, r)$ by the stationary object distance information $A_S(k, r)$, thereby calculating a normalized moving object distance information $A_X(k, r)$. For example, the amplitude of the moving object distance information $A_M(k, r)$ is normalized by the amplitude of the stationary object distance information $A_S(k, r)$ for each distance r, given by:

$$A_X(k, r) = \frac{|A_M(k, r)|}{|A_S(k, r)|} \quad (5)$$

If the human body exists at a distance $r_1$ and no stationary object exists, the relationship between moving object distance information $A_M(k, r_1)$ and stationary object distance information $A_S(k, r_1)$ is given by:

$$|A_M(k,r_1)| > |A_S(k,r_1)| \quad (6)$$

On the other hand, consider a case in which only a stationary object exists at a distance $r_2$ and the stationary object distance information is given by:

$$A_S(k,r_2) = \sqrt{P_2} e^{j\phi_2} \quad (7)$$

where j represents an imaginary unit, and $P_2$ and $\phi_2$ respectively represent the power and phase of a signal reflected and received from the stationary object existing at the distance $r_2$. If the reflection intensity from the stationary object decreases due to shadowing, measured distance information $A(k, r_2)$ is given by:

$$A(k,r_2) = \sqrt{\beta} \sqrt{P_2} e^{j\phi_2} \quad (8)$$

where $\beta$ represents a constant indicating the amount of shadowing and falling within the range from 0 (inclusive) to 1 (inclusive). If no shadowing occurs at all, $\beta=1$ is obtained. At this time, if moving object distance information $A_M(k, r_2)$ is calculated in accordance with equation (4), it is given, from equations (4), (7), and (8), by:

$$A_M(k,r_2) = A(k,r_2) = (\sqrt{\beta} - 1)\sqrt{P_2} e^{j\phi_2} \quad (9)$$

Even though only the stationary object exists at the distance $r_2$, if $\beta \neq 1$, the moving object distance information $A_M(k, r_2)$ given by equation (9) does not become zero. The moving object distance information $A_M(k, r_2)$ is a virtual image caused by shadowing. At this time, the relationship between the amplitude of the moving object distance information $A_M(k, r_2)$ and that of stationary object distance information $A_S(k, r_2)$ is given by:

$$|A_M(k,r_2)| = |\sqrt{\beta} - 1|\sqrt{P_2} \leq \sqrt{P_2} = |A_S(k,r_2)| \quad (10)$$

If the amplitude $|A_M(k, r_2)|$ of the virtual image is large such that it cannot be neglected, as compared with an image $|A_M(k, r_1)|$ of the human body, the virtual image may be detected as a human body. At this time, if normalized moving object distance information $A_X(k, r_1)$ at the distance $r_1$ and normalized moving object distance information $A_X(k, r_2)$ at the distance $r_2$ are calculated in accordance with equation (5), they are represented by expressions (11) and (12) below, respectively, from equation (5), expression (6), and equation (10).

$$A_X(k,r_1) > 1 \quad (11)$$

$$A_X(k,r_2) \geq 1 \quad (12)$$

As given by expressions (11) and (12), the size $A_X(k, r_2)$ of the virtual image included in the normalized moving object distance information $A_X(k, r)$ is smaller than the size $A_X(k, r_1)$ of the image of the human body.

Alternatively, the amplitude of the moving object distance information $A_M(k, r)$ may be normalized using a value obtained by replacing, by a threshold $Th_1$, an element whose amplitude is smaller than the threshold $Th_1$ of the stationary object distance information $A_S(k, r)$ by using equation (13) below instead of equation (5).

$$A_X(k, r) = \frac{|A_M(k, r)|}{\max(|A_S(k, r)|, Th_1)} \quad (13)$$

The amplitude of the moving object distance information $A_M(k, r)$ may be normalized using a value obtained by adding a constant value $\Delta$ as a normalization term to the amplitude of the stationary object distance information $A_S(k, r)$, given by:

$$A_X(k, r) = \frac{|A_M(k, r)|}{|A_S(k, r)| + \Delta} \quad (14)$$

It is possible to avoid a phenomenon in which the amplitude of the normalized moving object distance information $A_X(k, r)$ becomes an extremely large value, by preventing normalization by zero or a value close to zero using the method indicated by equation (13) or (14). The normalizer 410 supplies the normalized moving object distance information $A_X(k, r)$ to the object identifier 420.

The object identifier 420 identifies reflection from the human body and reflection from another object based on the normalized moving object distance information $A_X(k, r)$ received from the normalizer 410. For example, the object identifier 420 determines that the object existing at the distance r that satisfies an inequality given by expression (15) below is a human body. On the other hand, the object identifier 420 determines that the object existing at the distance r that does not satisfy expression (15) below is a stationary object or a virtual image.

$$|A_X(k,r)| > Th_2 \quad (15)$$

where $Th_2$ represents a threshold. The object identifier 420 outputs an identification result.

Figure 5:
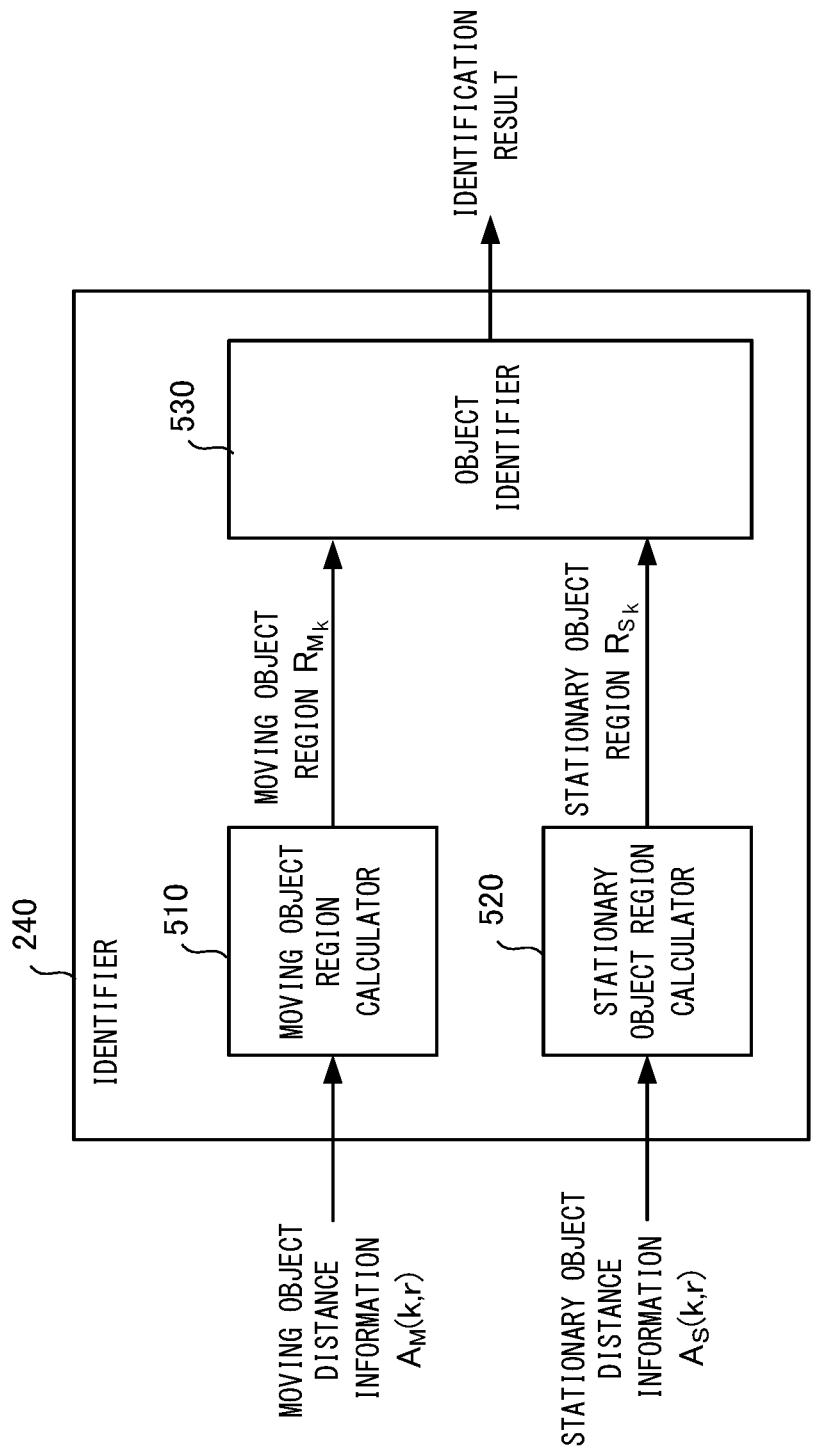
FIG. 5 is a block diagram showing another example of the arrangement of the identifier according to the second example embodiment of the present invention.

FIG. 5 is a block diagram for explaining another example of the arrangement of the identifier 240 included in the object identification apparatus 200 according to this example embodiment. As shown in FIG. 5, the identifier 240 includes a moving object region calculator 510, a stationary object region calculator 520, and an object identifier 530.

The moving object region calculator 510 receives the moving object distance information $A_M(k, r)$, and calculates a moving object region $R_{Mk}$. The moving object region $R_{Mk}$ is a set of the distances r at each of which the amplitude of the moving object distance information $A_M(k, r)$ is larger than a threshold $Th_3$, and is calculated by:

$$R_{Mk} = \{r \mid |A_M(k,r)| > Th_3\} \quad (16)$$

The moving object distance information $A_M(k, r)$ may include a virtual image component in addition to a reflection component from a moving object. Therefore, the moving object region $R_{Mk}$ may include the distance r at which a virtual image exists, in addition to the distance r at which the moving object exists. The moving object region calculator 510 supplies the moving object region $R_{Mk}$ to the object identifier 530.

The stationary object region calculator 520 receives the stationary object distance information $A_S(k, r)$, and calculates a stationary object region $R_{Sk}$. The stationary object region $R_{Sk}$ is a set of the distances r at each of which the amplitude of the stationary object distance information $A_S(k, r)$ is larger than a threshold $Th_4$, and is calculated by:

$$R_{Sk} = \{r \mid |A_S(k,r)| > Th_4\} \quad (17)$$

The stationary object region $R_{Sk}$ is a set of the distances r at each of which a stationary object exists. The stationary object region calculator 520 supplies the stationary object region $R_{Sk}$ to the object identifier 530.

The object identifier 530 identifies reflection from the human body and reflection from another object based on the moving object region $R_{Mk}$ received from the moving object region calculator 510 and the stationary object region $R_{Sk}$ received from the stationary object region calculator 520. The moving object region $R_{Mk}$ may include the distance $r_2$ at which the virtual image exists, in addition to the distance $r_1$ at which the moving object exists. At this time, since the stationary object exists not at the distance $r_1$ but at the distance $r_2$, the stationary object region $R_{Sk}$ includes not the distance $r_1$ but the distance $r_2$. For this reason, the object identifier 530 determines that an object existing at the distance $r_1$ which is not included in the stationary object region $R_{Sk}$ among the distances r included in the moving object region $R_{Mk}$ is a human body. Furthermore, the object identifier 530 determines that an object existing at the distance $r_2$ which is included in the stationary object region $R_{Sk}$ among the distances r included in the moving object region $R_{Mk}$ is a virtual image. The object identifier 530 outputs an identification result.

As described above, in the arrangement according to this example embodiment, a human body and a virtual image are identified using the moving object distance information $A_M(k, r)$ and the stationary object distance information $A_S(k, r)$, and it is thus possible to detect only a human body in an environment in which a background stationary object exists behind the moving human body.

Third Example Embodiment

Figure 6:
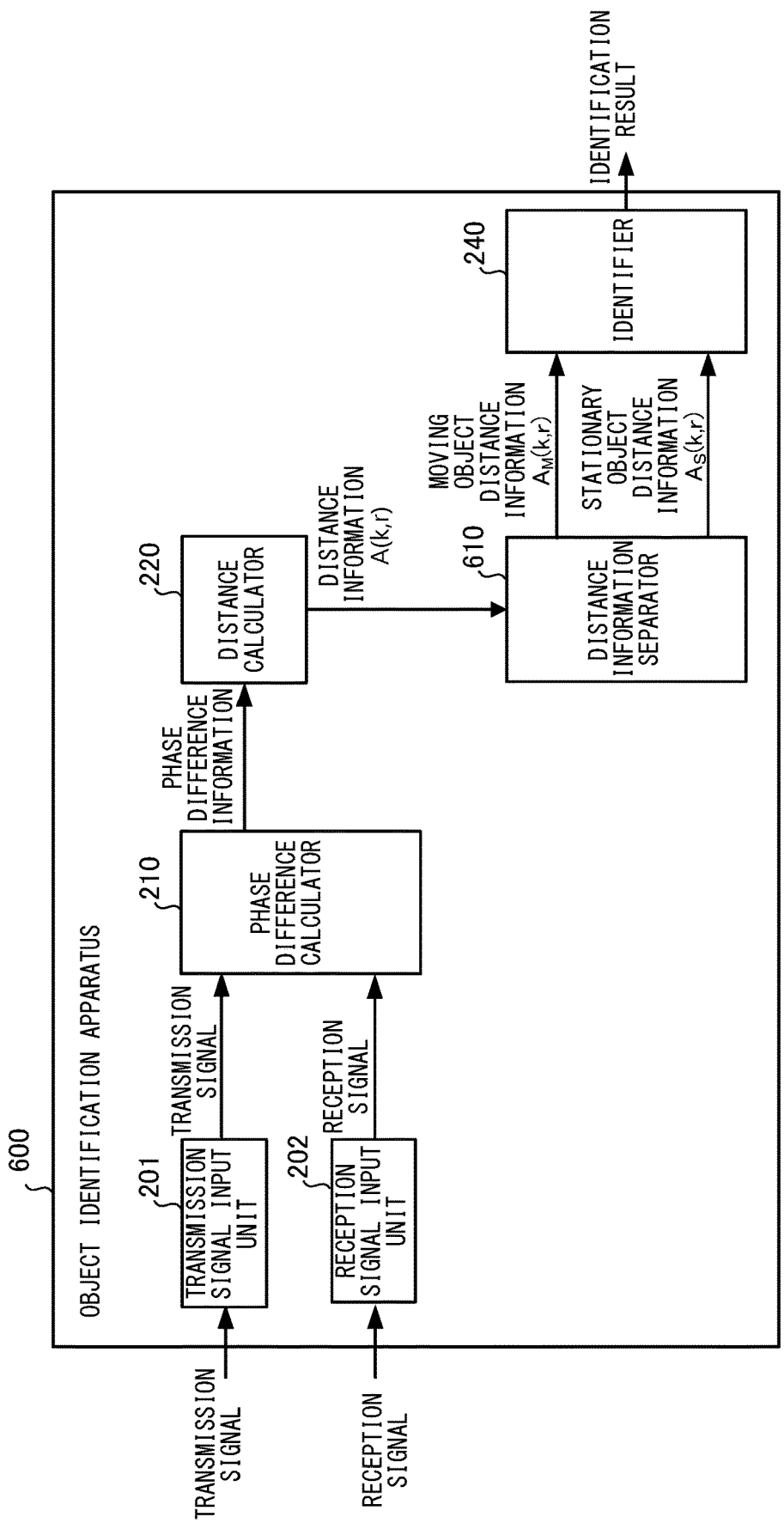
FIG. 6 is a block diagram showing the arrangement of an object identification apparatus according to the third example embodiment of the present invention.

An object identification apparatus 600 according to the third example embodiment of the present invention will be described with reference to FIG. 6. As compared with the object identification apparatus 200 according to the second example embodiment shown in FIG. 2, the object identification apparatus 600 according to this example embodiment shown in FIG. 6 includes a distance information separator 610 instead of the distance information separator 230. The remaining components and operations are similar to those in the second example embodiment. Hence, the same reference numerals denote the similar components, and a detailed description thereof will be omitted.

Figure 7:
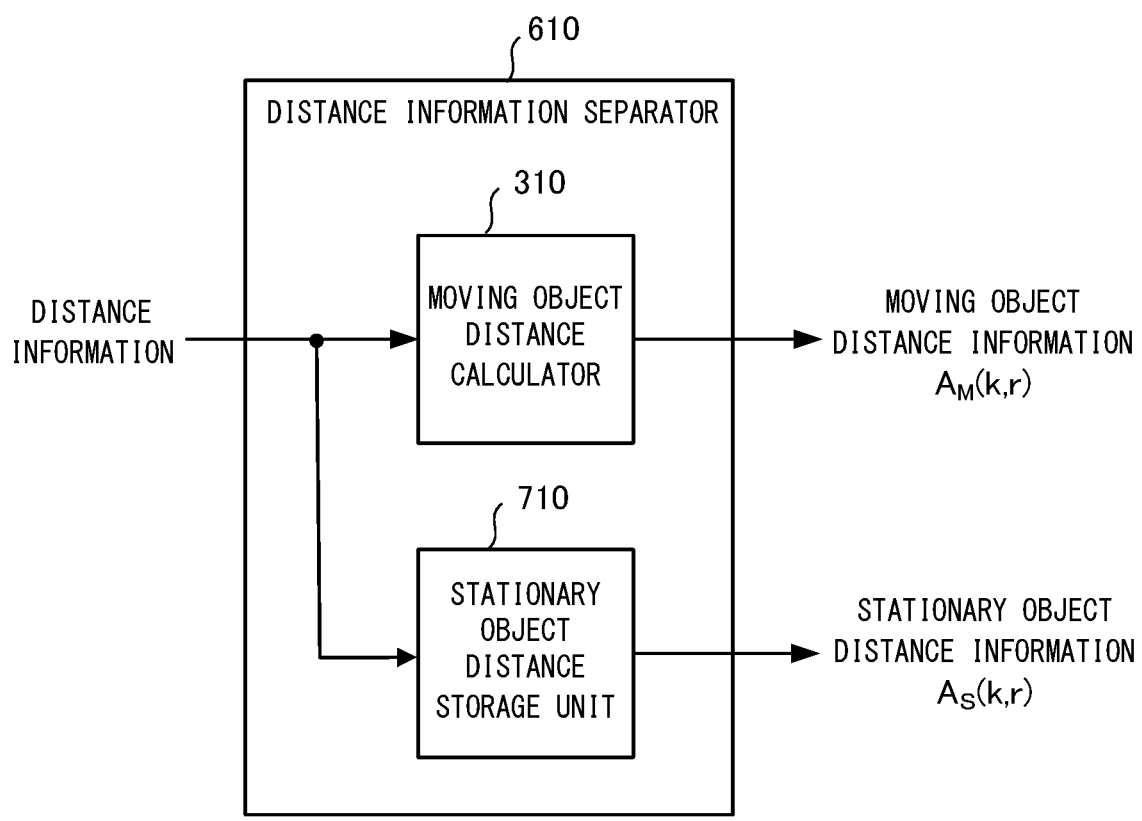
FIG. 7 is a block diagram showing the arrangement of a distance information separator according to the third example embodiment of the present invention.

The distance information separator 610 according to the third example embodiment of the present invention will be described with reference to FIG. 7. As compared with the distance information separator 230 according to the second example embodiment shown in FIG. 3, the distance information separator 610 according to this example embodiment shown in FIG. 7 includes a stationary object distance information storage unit 710 instead of the stationary object distance calculator 320. The remaining components and operations are similar to those in the second example embodiment. Hence, the same reference numerals denote the similar components, and a detailed description thereof will be omitted.

In this example embodiment, at a time before the start of measurement for the purpose of detecting a human body, pre-measurement is performed for the purpose of storing stationary object distance information $A_S(k, r)$. Pre-measurement is performed at a time when no moving object exists in a space and only a stationary object exists in the space. At the time of the pre-measurement, the stationary object distance information storage unit 710 receives distance information $A(k, r)$ from a distance calculator 220. The distance information $A(k, r)$ obtained in the pre-measurement includes only distance information about the stationary object. Therefore, the stationary object distance information storage unit 710 stores the distance information $A(k, r)$ as the stationary object distance information $A_S(k, r)$.

After the end of the pre-measurement, if measurement for the purpose of detecting a human body is started, the stationary object distance information storage unit 710 supplies the stationary object distance information $A_S(k, r)$ stored in the pre-measurement to an identifier 240.

With this arrangement, in addition to the effect of the second example embodiment, it is possible to provide a low-end high-performance object identification apparatus since it is unnecessary to calculate the stationary object distance information $A_S(k, r)$ for each measurement operation by storing the stationary object distance information $A_S(k, r)$ at a time before the start of measurement for the purpose of detecting a human body.

Fourth Example Embodiment

Figure 8:
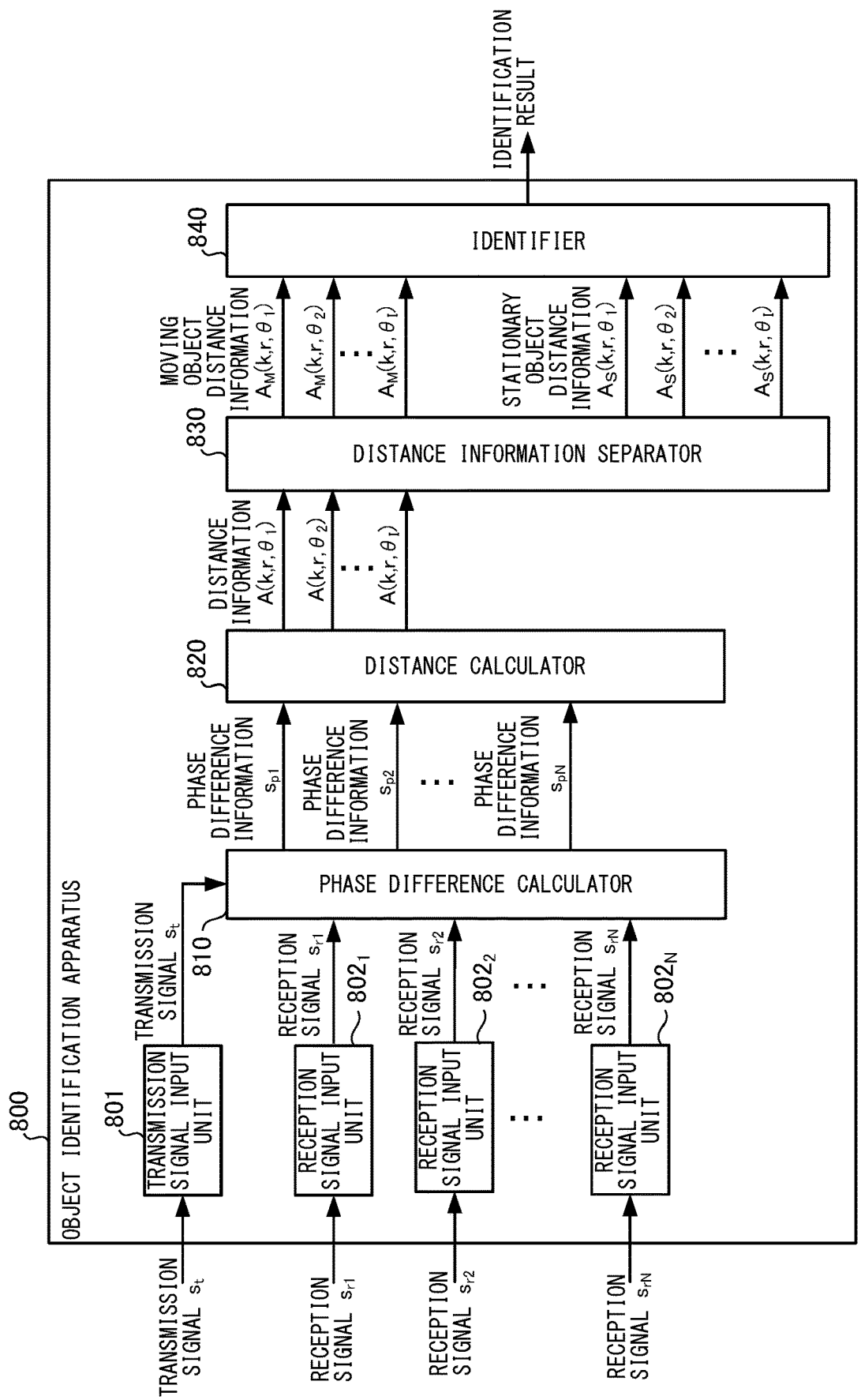
FIG. 8 is a block diagram showing the arrangement of an object identification apparatus according to the fourth example embodiment of the present invention.

An object identification apparatus 800 according to the fourth example embodiment of the present invention will be described next with reference to FIG. 8. FIG. 8 is a block diagram for explaining the arrangement of the object identification apparatus 800 according to the fourth example embodiment.

The object identification apparatus 800 includes a transmission signal input unit 801, a plurality of reception signal input units $802_1, \ldots, 802_N$, a phase difference calculator 810, a distance calculator 820, a distance information separator 830, and an identifier 840. Note that N represents the total number of reception signal input units.

The transmission signal input unit 801 receives a transmission signal $s_t$, and supplies it to the phase difference calculator 810. A reception signal input unit $802_n$ receives a reception signal $s_{rn}$, and supplies it to the phase difference calculator 810. Note that n is an integer of 1 to N. The reception signal $s_{rn}$ is one of the reception signals $s_{r1}, \ldots, s_{rN}$ obtained by receiving, by each of a plurality of reception antennas, the transmission signal $s_t$ reflected by a human body and a stationary object. Phase differences are generated among the plurality of reception signals $s_{r1}, \ldots, s_{rN}$ in accordance with the directions in which the human body and the stationary object exist.

The phase difference calculator 810 is supplied with the transmission signal $s_t$ from the transmission signal input unit 801 while being supplied with the reception signals $s_{r1}, \ldots, s_{rN}$ from the plurality of reception signal input units $802_1, \ldots, 802_N$, respectively. For the plurality of reception signals $s_{r1}, \ldots, s_{rN}$, the phase difference calculator 810 calculates pieces of phase difference information $s_{p1}, \ldots, s_pN$ with respect to the transmission signal $s_t$. The phase difference calculator 810 supplies the plurality of pieces of phase difference information $s_{p1}, \ldots, s_{pN}$ to the distance calculator 820. Phase differences are generated among the plurality of pieces of phase difference information $s_{p1}, \ldots, s_{pN}$ in accordance with the directions in which the human body and the stationary object exist.

The distance calculator 820 receives the plurality of pieces of phase difference information $s_{p1}, \ldots, s_{pN}$ from the phase difference calculator 810. Using the plurality of pieces of phase difference information $s_{p1}, \ldots, s_{pN}$, the distance calculator 820 calculates pieces of distance information $A(k, r, \theta_1), \ldots, A(k, r, \theta_I)$ with respect to a plurality of directions $\theta_1, \ldots, \theta_I$ defined in advance within the range of a space where the human body is detected. Note that I represents the total number of directions $\theta$. As a method of defining the directions, for example, there is provided a method of defining the directions at equal intervals in the range from −90° to 90° by setting, as 0°, the front direction when viewed from the object identification apparatus 800. There is also provided a setting method of narrowing the angular interval around 0° in the range from −90° to 90° and widening the angular interval around 90° and −90°. A method of calculating the pieces of distance information $A(k, r, \theta_1), \ldots, A(k, r, \theta_I)$ with respect to the plurality of directions $\theta_1, \ldots, \theta_I$ will be described in detail below. First, the distance calculator 820 calculates pieces of distance information $A_1(k, r), \ldots, A_N(k, r)$ with respect to the plurality of pieces of phase difference information $s_{p1}, \ldots, s_{pN}$, similar to the second example embodiment. After that, the distance calculator 820 calculates the pieces of distance information $A(k, r, \theta_1), \ldots, A(k, r, \theta_I)$ with respect to the plurality of directions $\theta_1, \ldots, \theta_I$ using the pieces of distance information $A_1(k, r), \ldots, A_N(k, r)$. For example, if a linear array antenna in which N antennas are linearly arrayed receives the reception signals $s_{r1}, \ldots, s_{rN}$, the distance information $A(k, r, \theta_i)$ can be calculated by applying a classic beamformer method by Bartlett in non-patent literature 1, given by:

$$A(k, r, \theta_i) = \sum_{n=1}^{N} A_n(k, r) \exp\left(-j\frac{2\pi}{\lambda} d_n \sin\theta_i\right) \quad (18)$$

where $\lambda$ represents the wavelength of a transmission signal $S_t$ emitted to the space, and $d_n$ represents a distance between a reception antenna that receives a reception signal $S_{r1}$ and a reception antenna that receives a reception signal $S_{rn}$. The distance calculator 820 supplies the pieces of distance information $A(k, r, \theta_1), \ldots, A(k, r, \theta_I)$ to the distance information separator 830.

The distance information separator 830 separates the pieces of distance information $A(k, r, \theta_1), \ldots, A(k, r, \theta_I)$ received from the distance calculator 820 into pieces of moving object distance information $A_M(k, r, \theta_1), \ldots, A_M(k, r, \theta_I)$ and pieces of stationary object distance information $A_S(k, r, \theta_1), \ldots, A_S(k, r, \theta_I)$, respectively. By paying attention to a given direction $\theta_i$, the distance information separator 830 separates distance information $A(k, r, \theta_i)$ into moving object distance information $A_M(k, r, \theta_i)$ and stationary object distance information $A_S(k, r, \theta_i)$, similar to the operation of the distance information separator 230 according to the second example embodiment. The distance information separator 830 performs this separation processing for all the directions $\theta_1, \ldots, \theta_I$. The distance information separator 830 supplies the pieces of moving object distance information $A_M(k, r, \theta_1), \ldots, A_M(k, r, \theta_I)$ and the pieces of stationary object distance information $A_S(k, r, \theta_1), \ldots, A_S(k, r, \theta_I)$ to the identifier 840.

The identifier 840 identifies the human body and the stationary object by removing a virtual image formed at the distance of the stationary object using the pieces of moving object distance information $A_M(k, r, \theta_1), \ldots, A_M(k, r, \theta_I)$ and the pieces of stationary object distance information $A_S(k, r, \theta_1), \ldots, A_S(k, r, \theta_I)$ received from the distance information separator 830. By paying attention to the given direction $\theta_i$, the identifier 840 identifies the human body and the stationary object by removing a virtual image formed at the distance of the stationary object using the moving object distance information $A_M(k, r, \theta_i)$ and the stationary object distance information $A_S(k, r, \theta_i)$, similar to the operation of the identifier 240 according to the second example embodiment. Note that i is an integer of 1 to I. The identifier 840 performs this identification processing for all the directions $\theta_1, \ldots, \theta_I$. The identifier 840 outputs an identification result.

As described above, in the arrangement according to this example embodiment, a human body and a virtual image are identified using the pieces of moving object distance information $A_M(k, r, \theta_1), \ldots, A_M(k, r, \theta_I)$ and the pieces of stationary object distance information $A_S(k, r, \theta_1), \ldots, A_S(k, r, \theta_I)$ with respect to the plurality of directions $\theta_1, \ldots, \theta_I$. Therefore, it is possible to detect only a human body even in an environment in which a background stationary object exists at equal distances in directions different from the moving human body in addition to an environment in which a background stationary object exists behind the moving human body.

Fifth Example Embodiment

Figure 9:
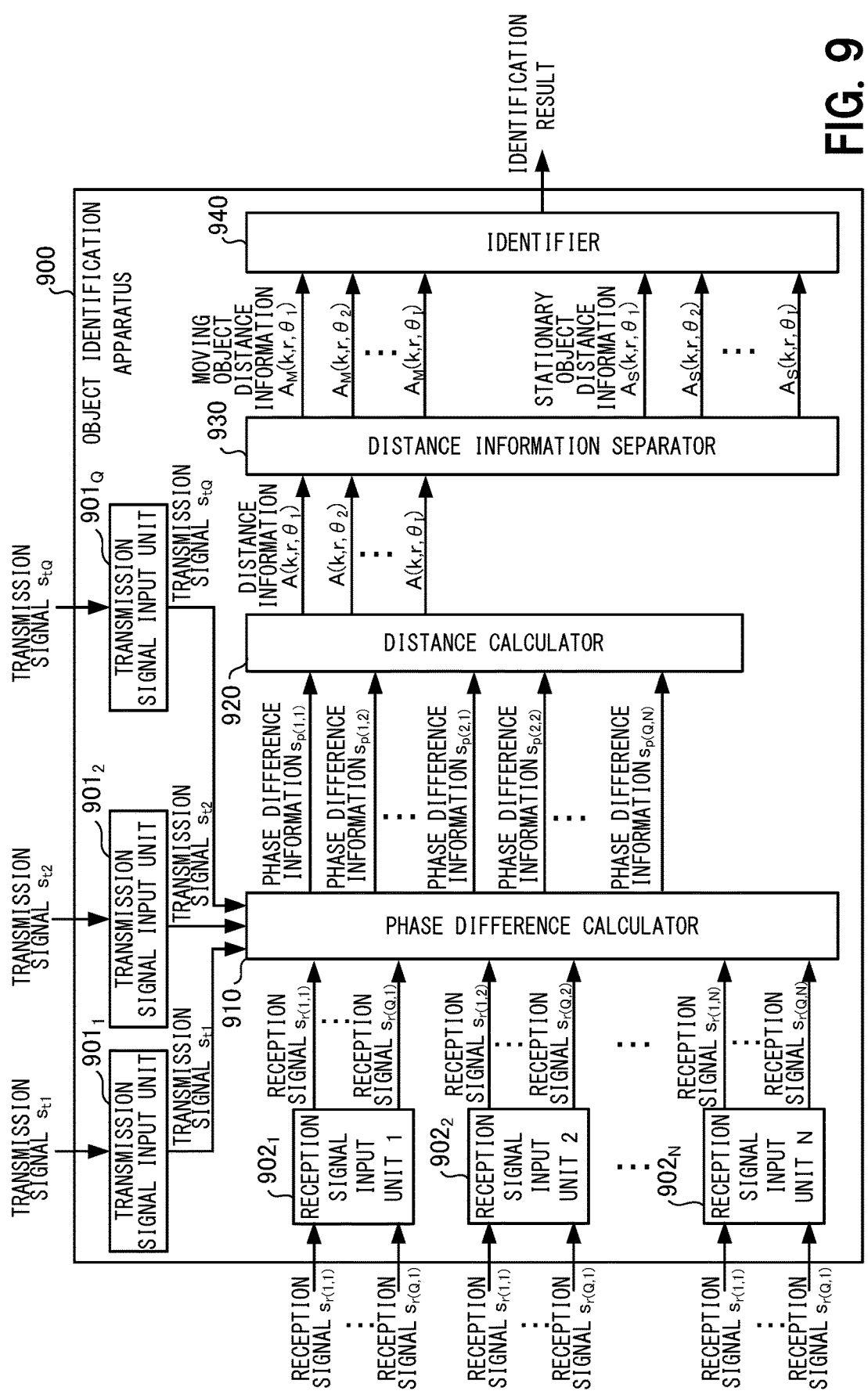
FIG. 9 is a block diagram showing the arrangement of an object identification apparatus according to the fifth example embodiment of the present invention.

An object identification apparatus 900 according to the fifth example embodiment of the present invention will be described next with reference to FIG. 9. FIG. 9 is a block diagram for explaining the arrangement of the object identification apparatus 900 according to the fifth example embodiment.

The object identification apparatus 900 includes a plurality of transmission signal input units $901_1, \ldots, 901_Q$, a plurality of reception signal input units $902_1, \ldots, 902_N$, a phase difference calculator 910, a distance calculator 920, a distance information separator 830, and an identifier 840. Note that Q represents the total number of transmission signal input units.

A transmission signal input unit $901_q$ receives a transmission signal $s_{tq}$, and supplies it to the phase difference calculator 910. Note that q is an integer of 1 to Q. The transmission signal $s_{tq}$ is one of transmission signals $s_{t1}, \ldots, s_{tQ}$ obtained by irradiation to a space by a plurality of transmission antennas. In addition, the transmission signals $s_{t1}, \ldots, s_{tQ}$ are multiplexed by a method such as time division multiplexing, frequency division multiplexing, or code division multiplexing, and then emitted to the space. The reception signal input unit $902_n$ receives a plurality of reception signals $s_{r(1,n)}, \ldots, s_{r(Q, N)}$, and supplies them to the phase difference calculator 910. The plurality of reception signals $s_{r(1,n)}, \ldots, s_{r(Q, n)}$ are obtained by receiving, by one of a plurality of reception antennas, the plurality of transmission signals $s_{t1}, \ldots, s_{tQ}$ reflected by a human body and a stationary object. The N reception signal input units obtain the total number Q×N of reception signals $s_{r(1, 1)}, \ldots, s_{r(Q, N)}$, and phase differences are generated among the reception signals in accordance with the directions in which the human body and the stationary object exist.

The phase difference calculator 910 is supplied with the transmission signals $s_{t1}, \ldots, s_{tQ}$ from the transmission signal input units $901_1, \ldots, 901_Q$, respectively, while being supplied with the total number Q×N of reception signals $s_{r(1, 1)}, \ldots, s_{r(Q, N)}$ from the plurality of reception signal input units $902_1, \ldots, 902_N$, respectively. The phase difference calculator 910 calculates, for each supplied reception signal $s_{r(q, n)}$, phase difference information $s_{p(q, n)}$ with respect to the corresponding transmission signal $s_{tn}$. The phase difference calculator 910 supplies the total number Q×N of pieces of phase difference information $s_{p(1,1)}, \ldots, s_{p(Q, N)}$ to the distance calculator 920. Phase differences are generated among the total number Q×N of pieces of phase difference information $s_{p(1,1)}, \ldots, s_{p(Q,N)}$ in accordance with the directions in which the human body and the stationary object exist.

The distance calculator 920 receives the total number Q×N of pieces of phase difference information $s_{p(1,1)}, \ldots, s_{p(Q, N)}$ from the phase difference calculator 910. Using the total number Q×N of pieces of phase difference information $s_{p(1,1)}, \ldots, s_{p(Q, N)}$, the distance calculator 920 calculates pieces of distance information A(k, r, θ$_1$), ..., A(k, r, θ$_I$) with respect to a plurality of directions θ$_1$, ..., θ$_I$ defined in advance within the range of a space where the human body is detected, similar to the fourth example embodiment. A method of calculating the pieces of distance information A(k, r, θ$_1$), ..., A(k, r, θ$_I$) with respect to the plurality of directions θ$_1$, ..., θ$_I$ will be described in detail below.

The distance calculator 920 calculates pieces of distance information A$_{(1, 1)}$(k, r), ..., A$_{(Q, N)}$(k, r) for the total number Q×N of pieces of phase difference information s$_{p(1,1)}$, ..., s$_{p(Q, N)}$, respectively, similar to the second example embodiment. After that, the distance calculator 920 calculates the pieces of distance information A(k, r, θ$_1$), ..., A(k, r, θ$_I$) with respect to the plurality of directions θ$_1$, ..., θ$_I$ using the pieces of distance information A$_{(1, 1)}$(k, r), ..., A$_{(Q, N)}$(k, r). For example, if a linear array antenna in which Q antennas are linearly arrayed emits the transmission signals S$_{t1}$, ..., s$_{tQ}$ to the space and a linear array antenna in which N antennas are linearly arrayed receives the reception signals s$_{r(1, 1)}$, ..., s$_{r(Q, N)}$, distance information A(k, r, θ$_i$) can be calculated by applying a classic beamformer method by Bartlett in non-patent literature 1, given by:

$$A(k, r, \theta_i) = \sum_{q=1}^{Q} \sum_{n=1}^{N} A_{(q,n)}(k, r) \exp\left\{-j\frac{2\pi}{\lambda}(d_q + d_n)\sin\theta_i\right\} \quad (19)$$

where d$_q$ represents a distance between a transmission antenna that emits a transmission signal S$_{t1}$ and a transmission antenna that emits a transmission signal S$_{tq}$. The distance calculator 920 supplies the pieces of distance information A(k, r, θ$_1$), ..., A(k, r, θ$_I$) to the distance information separator 830.

To suppress mixing of a component from another direction while obtaining distance information with respect to a direction of interest, a number of pieces of phase difference information are required. In the arrangement according to this example embodiment, since it is possible to obtain pieces of phase difference information the number of which is equal to the product Q×N of the number of transmission antennas and the number of reception antennas, the separation detection performance of objects existing in different directions is improved, as compared with the fourth example embodiment in which pieces of phase difference information the number of which is equal to the number N of reception antennas are obtained.

Sixth Example Embodiment

Figure 10:
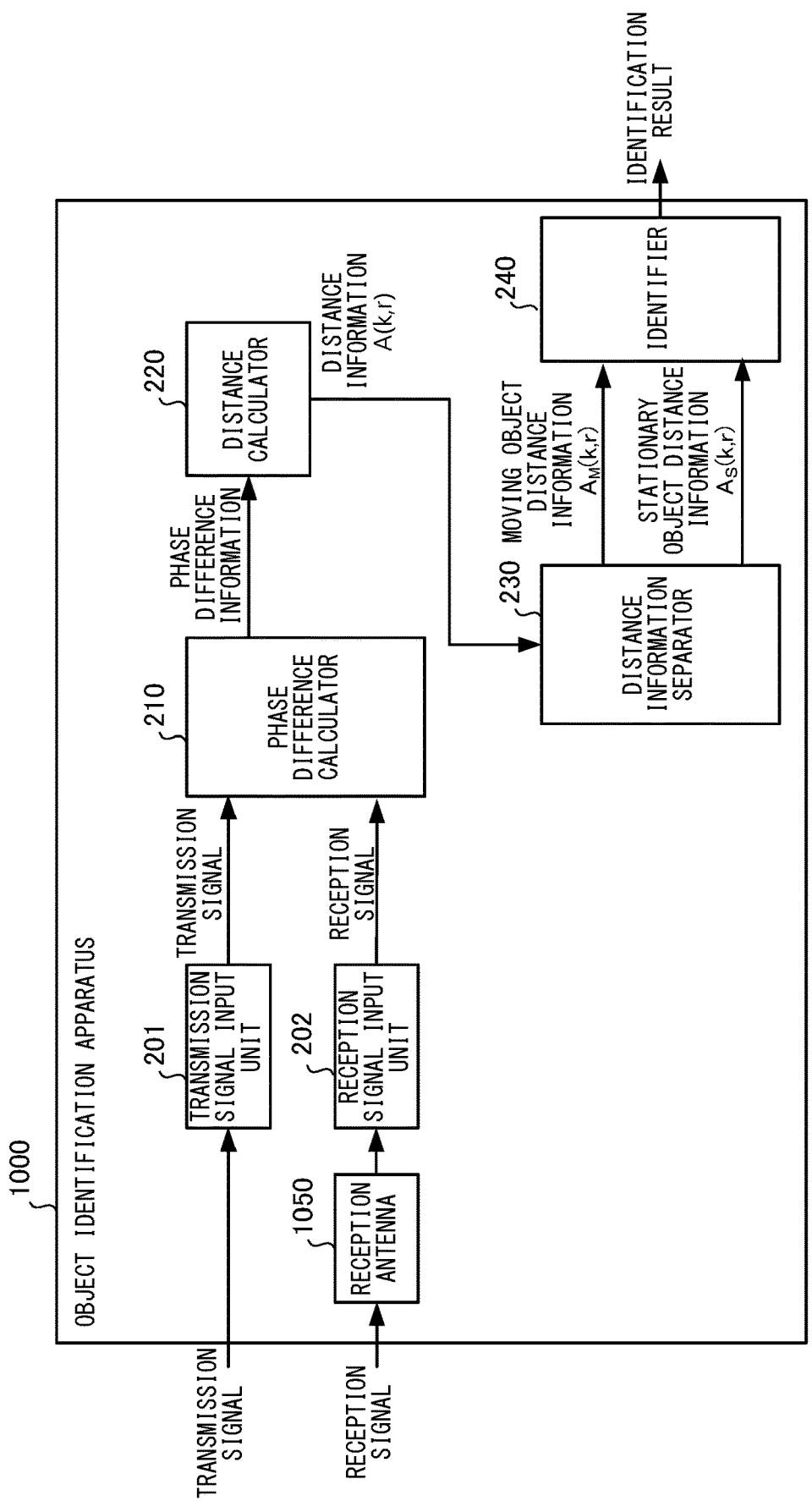
FIG. 10 is a block diagram showing the arrangement of an object identification apparatus according to the sixth example embodiment of the present invention.

An object identification apparatus 1000 according to the sixth example embodiment of the present invention will be described next with reference to FIG. 10. FIG. 10 is a block diagram for explaining the arrangement of the object identification apparatus 1000 according to the sixth example embodiment.

The object identification apparatus 1000 includes a reception antenna 1050. The remaining components and operations are similar to those in the second example embodiment. Hence, the same reference numerals denote the similar components, and a detailed description thereof will be omitted.

The reception antenna 1050 receives, as a reception signal, a transmission signal reflected by a human body and a stationary object, and supplies it to a reception signal input unit 102.

As described above, in the arrangement according to this example embodiment, since the reception antenna is provided, it is possible to obtain the same effect as in the second example embodiment without additionally preparing a reception antenna.

Seventh Example Embodiment

An object identification apparatus 1100 according to the seventh example embodiment of the present invention will be described next with reference to FIG. 11. FIG. 11 is a block diagram for explaining the arrangement of the object identification apparatus 1100 according to the seventh example embodiment.

The object identification apparatus 1100 includes a transmission signal generator 1160 and a transmission antenna 1170. The remaining components and operations are similar to those in the sixth example embodiment. Hence, the same reference numerals denote the similar components, and a detailed description thereof will be omitted.

The transmission signal generator 1160 generates a transmission signal, and supplies it to a transmission signal input unit 201 and the transmission antenna 1170. The transmission antenna 1170 irradiates a space with the transmission signal supplied from the transmission signal generator 1160.

As described above, in the arrangement according to this example embodiment, since the transmission signal generator and the transmission antenna are provided, it is possible to obtain the same effect as in the sixth example embodiment without additionally preparing a transmission signal generator or a transmission antenna.

Other Example Embodiments

The plurality of example embodiments of the present invention have been described above in detail. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of the above-described example embodiments is supplied to the system or apparatus directly or from a remote site. The program is executed by a processor such as a DSP (Digital Signal Processor) forming a signal processing apparatus. Furthermore, the present invention also incorporates the program installed in a computer to implement the functions of the present invention by the computer, a medium storing the program, and a WWW (World Wide Web) server that causes a user to download the program.

Figure 12:
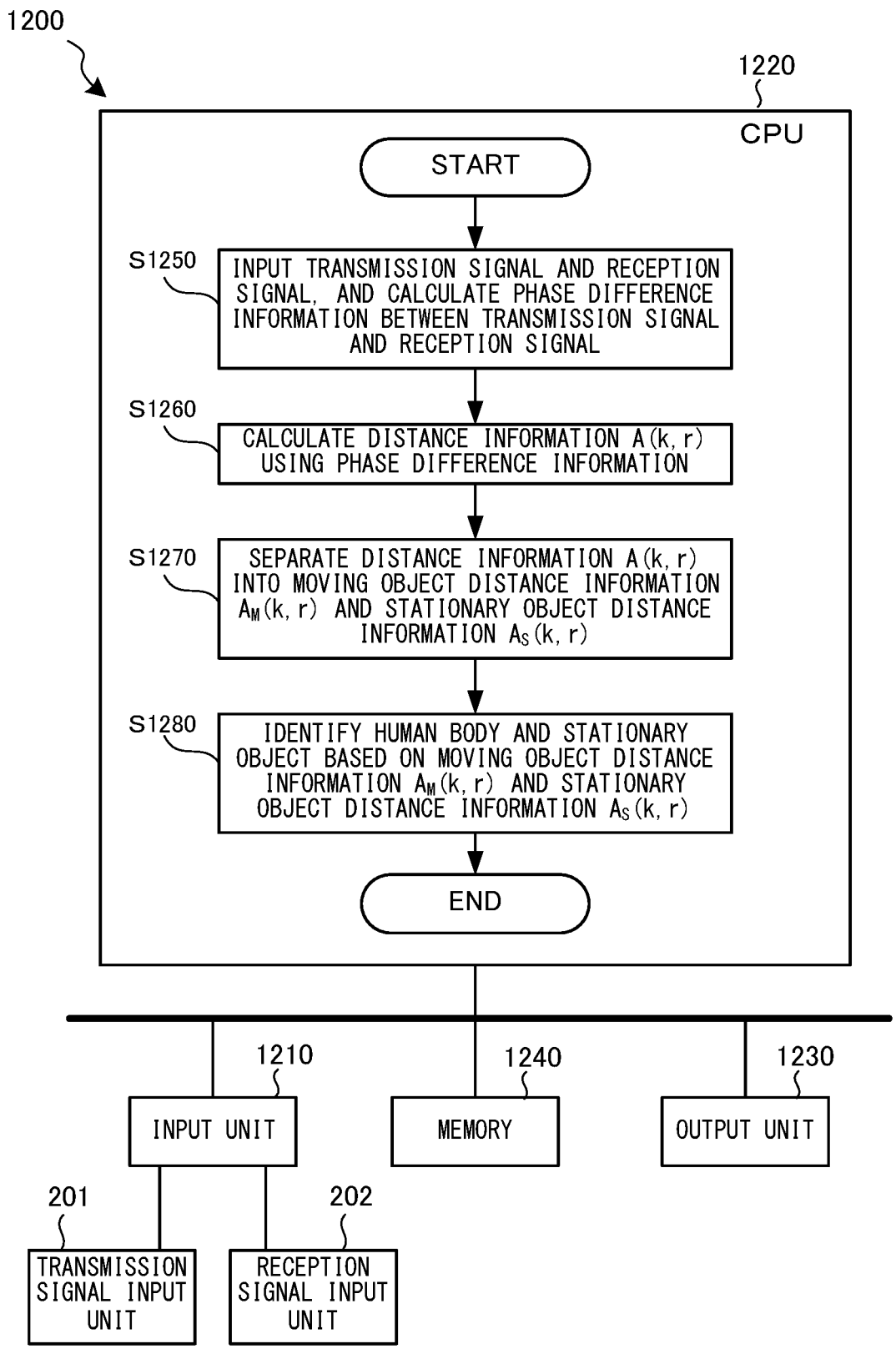
FIG. 12 is a block diagram showing the arrangement of a computer according to the first example embodiment of the present invention.

FIG. 12 is a block diagram showing, when a signal processing program forms the first example embodiment, the arrangement of a computer 1200 that executes the signal processing program. The computer 1200 includes an input unit 1210, a CPU 1220, an output unit 1230, and a memory 1240.

The CPU 1220 controls the operation of the computer 1200 by reading the signal processing program stored in a memory 1240. That is, after executing the signal processing program, in step S1250 the CPU 1220 inputs a transmission signal and a reception signal from the input unit 1210, and calculates phase difference information between the transmission signal and the reception signal.

In step S1260, the CPU 1220 calculates distance information A(k, r) using the phase difference information.

In step S1270, the CPU 1220 separates the distance information A(k, r) into moving object distance information $A_M$(k, r) and stationary object distance information $A_S$(k, r).

In step S1280, the CPU 1220 identifies a human body and a stationary object by removing a virtual image formed at the distance of the stationary object using the moving object distance information $A_M$(k, r) and the stationary object distance information $A_S$(k, r).

Other Expressions of Example Embodiments

Some or all of the above-described example embodiments can also be described as in the following supplementary notes but are not limited to the followings.

(Supplementary Note 1)

There is provided an object identification apparatus comprising:

a phase difference calculator that calculates phase difference information between a transmission signal and a reception signal obtained by reflecting, by surfaces of a moving object and a stationary object in a space, the transmission signal emitted to the space and receiving the reflected transmission signal;

a distance calculator that calculates distance information using the phase difference information;

a distance information separator that separates the distance information into moving object distance information as distance information about the moving object and stationary object distance information as distance information about the stationary object; and an identifier that identifies the stationary object and the moving object based on the stationary object distance information and the moving object distance information.

(Supplementary Note 2)

There is provided the object identification apparatus according to supplementary note 1, wherein the distance information separator includes a moving object distance calculator that outputs, as the moving object distance information, a component with a large variation of the distance information, and a stationary object distance calculator that outputs, as the stationary object distance information, a component with a small variation of the distance information.

(Supplementary Note 3)

There is provided the object identification apparatus according to supplementary note 1, wherein the distance information separator includes a moving object distance calculator that outputs, as the moving object distance information, a component with a large variation of the distance information, and a stationary object distance information storage unit that stores in advance, as the stationary object distance information, the distance information obtained when no moving object exists in the space and only the stationary object exists.

(Supplementary Note 4)

There is provided the object identification apparatus according to any one of supplementary notes 1 to 3, wherein the identifier includes a moving object region calculator that calculates a moving object region based on the moving object distance information, a stationary object region calculator that calculates a stationary object region based on the stationary object distance information, and an object identifier that identifies the stationary object and the moving object based on the moving object region and the stationary object region.

(Supplementary Note 5)

There is provided the object identification apparatus according to any one of supplementary notes 1 to 3, wherein the identifier includes a normalizer that calculates normalized moving object distance information by normalizing the moving object distance information by the stationary object distance information, and an object identifier that identifies the stationary object and the moving object using the normalized moving object distance information.

(Supplementary Note 6)

There is provided the object identification apparatus according to any one of supplementary notes 1 to 5, wherein the phase difference calculator receives the reception signal at each of a plurality of reception positions, and calculates, as a plurality of pieces of phase difference information, pieces of phase difference information respectively corresponding to combinations of the transmission signal and the plurality of reception signals, the distance calculator obtains pieces of distance information with respect to a plurality of directions using the plurality of pieces of phase difference information, and the distance information separator separates the pieces of distance information with respect to the plurality of directions into pieces of moving object distance information with respect to the plurality of directions and pieces of stationary object distance information with respect to the plurality of directions, respectively.

(Supplementary Note 7)

There is provided the object identification apparatus according to any one of supplementary notes 1 to 6, wherein the phase difference calculator transmits the transmission signal at each of a plurality of transmission positions, receives the reception signal at each of a plurality of reception positions, and calculates, as pieces of phase difference information, pieces of phase difference information respectively corresponding to combinations of the plurality of transmission signals and the plurality of reception signals, the distance calculator obtains pieces of distance information with respect to a plurality of directions using the plurality of pieces of phase difference information, and the distance information separator separates the pieces of distance information with respect to the plurality of directions into pieces of moving object distance information with respect to the plurality of directions and pieces of stationary object distance information with respect to the plurality of directions, respectively.

(Supplementary Note 8)

There is provided the object identification apparatus according to any one of supplementary notes 1 to 7, further comprising a reception antenna that generates the reception signal by receiving the transmission signal emitted to the space and reflected by the moving object and the stationary object, both of which are located in the space.

(Supplementary Note 9)

There is provided the object identification apparatus according to any one of supplementary notes 1 to 8, further comprising:

a transmission signal generator that generates the transmission signal; and a transmission antenna that emits the transmission signal to the space.

(Supplementary Note 10)

There is provided an object identification method comprising:

calculating phase difference information between a transmission signal and a reception signal;

calculating distance information using the phase difference information;

separating the distance information into moving object distance information as distance information about a moving object and stationary object distance information as distance information about a stationary object; and identifying the stationary object and the moving object based on the stationary object distance information and the moving object distance information.

(Supplementary Note 11)

There is provided an object identification program for causing a computer to execute a method, comprising:

calculating phase difference information between a transmission signal and a reception signal;

calculating distance information using the phase difference information;

separating the distance information into moving object distance information as distance information about a moving object and stationary object distance information as distance information about a stationary object; and identifying the stationary object and the moving object based on the stationary object distance information and the moving object distance information.

What is claimed is:

1. An object identification apparatus comprising:
a phase difference calculator that calculates phase difference information between a transmission signal and a reception signal obtained by reflecting, by surfaces of a moving object and a stationary object in a space, the transmission signal emitted to the space and receiving the reflected transmission signal;
a distance calculator that calculates distance information using the phase difference information;
a distance information separator that separates the distance information into moving object distance information as distance information about the moving object and stationary object distance information as distance information about the stationary object; and
an identifier that identifies the stationary object and the moving object based on the stationary object distance information and the moving object distance information, wherein
said phase difference calculator receives the reception signal at each of a plurality of reception positions, and calculates, as a plurality of pieces of phase difference information, pieces of phase difference information respectively corresponding to combinations of the transmission signal and the plurality of reception signals,
said distance calculator obtains pieces of distance information with respect to a plurality of directions using the plurality of pieces of phase difference information, and
said distance information separator separates the pieces of distance information with respect to the plurality of directions into pieces of moving object distance information with respect to the plurality of directions and pieces of stationary object distance information with respect to the plurality of directions, respectively.

2. The object identification apparatus according to claim 1, wherein said distance information separator includes
a moving object distance calculator that outputs, as the moving object distance information, a component with a large variation of the distance information, and
a stationary object distance calculator that outputs, as the stationary object distance information, a component with a small variation of the distance information.

3. The object identification apparatus according to claim 1, wherein said distance information separator includes
a moving object distance calculator that outputs, as the moving object distance information, a component with a large variation of the distance information, and
a stationary object distance information storage unit that stores in advance, as the stationary object distance information, the distance information obtained when no moving object exists in the space and only the stationary object exists.

4. The object identification apparatus according to claim 1, wherein said identifier includes
a moving object region calculator that calculates a moving object region based on the moving object distance information, and
a stationary object region calculator that calculates a stationary object region based on the stationary object distance information,
wherein the stationary object and the moving object are identified based on the moving object region and the stationary object region.

5. The object identification apparatus according to claim 1, wherein said identifier includes
a normalizer that calculates normalized moving object distance information by normalizing the moving object distance information by the stationary object distance information, and
wherein the stationary object and the moving object are identified by using the normalized moving object distance information.

6. An object identification apparatus comprising:
a phase difference calculator that calculates phase difference information between a transmission signal and a reception signal obtained by reflecting, by surfaces of a moving object and a stationary object in a space, the transmission signal emitted to the space and receiving the reflected transmission signal;
a distance calculator that calculates distance information using the phase difference information;
a distance information separator that separates the distance information into moving object distance information as distance information about the moving object and stationary object distance information as distance information about the stationary object; and
an identifier that identifies the stationary object and the moving object based on the stationary object distance information and the moving object distance information, wherein
said phase difference calculator transmits the transmission signal at each of a plurality of transmission positions, receives the reception signal at each of a plurality of reception positions, and calculates, as pieces of phase difference information, pieces of phase difference information respectively corresponding to combinations of the plurality of transmission signals and the plurality of reception signals,
said distance calculator obtains pieces of distance information with respect to a plurality of directions using the plurality of pieces of phase difference information, and said distance information separator separates the pieces of distance information with respect to the plurality of directions into pieces of moving object distance information with respect to the plurality of directions and pieces of stationary object distance information with respect to the plurality of directions, respectively.

7. The object identification apparatus according to claim 1, further comprising a reception antenna that generates the reception signal by receiving the transmission signal emitted to the space and reflected by the moving object and the stationary object, both of which are located in the space.

8. An object identification method comprising:

calculating phase difference information between a transmission signal and a reception signal by receiving the reception signal at each of a plurality of reception positions, and calculating, as a plurality of pieces of phase difference information, pieces of phase difference information respectively corresponding to combinations of the transmission signal and the plurality of reception signals;

calculating distance information using the phase difference information by obtaining pieces of distance information with respect to a plurality of directions using the plurality of pieces of phase difference information;

separating the distance information into moving object distance information as distance information about a moving object and stationary object distance information as distance information about a stationary object by separating the pieces of distance information with respect to the plurality of directions into pieces of moving object distance information with respect to the plurality of directions and pieces of stationary object distance information with respect to the plurality of directions, respectively;

identifying the stationary object and the moving object based on the stationary object distance information and the moving object distance information.

9. A non-transitory computer readable medium storing an object identification program for causing a computer to execute a method, comprising:

calculating phase difference information between a transmission signal and a reception signal by receiving the reception signal at each of a plurality of reception positions, and calculating, as a plurality of pieces of phase difference information, pieces of phase difference information respectively corresponding to combinations of the transmission signal and the plurality of reception signals;

calculating distance information using the phase difference information by obtaining pieces of distance information with respect to a plurality of directions using the plurality of pieces of phase difference information;

separating the distance information into moving object distance information as distance information about a moving object and stationary object distance information as distance information about a stationary object by separating the pieces of distance information with respect to the plurality of directions into pieces of moving object distance information with respect to the plurality of directions and pieces of stationary object distance information with respect to the plurality of directions, respectively; and identifying the stationary object and the moving object based on the stationary object distance information and the moving object distance information.

* * * * *